(12) United States Patent
Vermeersch et al.

(10) Patent No.: US 7,453,944 B2
(45) Date of Patent: Nov. 18, 2008

(54) MULTI-MODE SIGNAL MODIFICATION CIRCUIT WITH COMMON MODE BYPASS

(75) Inventors: Dean Camiel William Vermeersch, Harrisburg, PA (US); Thinh Phuc Nguyen, Harrisburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 689 days.

(21) Appl. No.: 11/018,293

(22) Filed: Dec. 21, 2004

(65) Prior Publication Data

US 2006/0146921 A1  Jul. 6, 2006

(51) Int. Cl.
*H04B 3/00* (2006.01)
*H04L 25/00* (2006.01)
*G05B 11/01* (2006.01)

(52) U.S. Cl. .................. 375/257; 375/222; 375/350; 340/310.11

(58) Field of Classification Search ............ 340/310.01; 375/257, 222, 350; 370/497, 343, 481; 307/3; 702/189, 75

See application file for complete search history.

(56) References Cited

U.S. PATENT DOCUMENTS

| 5,659,546 A | * | 8/1997 | Elder ........................ 370/343 |
| 5,933,071 A | | 8/1999 | Brown |
| 6,420,873 B1 | * | 7/2002 | Guthrie ...................... 324/322 |
| 6,628,781 B1 | * | 9/2003 | Grundstrom et al. ... 379/406.14 |
| 7,058,548 B2 | * | 6/2006 | Pupalaikis et al. .......... 702/189 |
| 2004/0071219 A1 | * | 4/2004 | Vorenkamp et al. ......... 375/257 |

* cited by examiner

*Primary Examiner*—Brian Zimmerman
*Assistant Examiner*—Nam V Nguyen

(57) ABSTRACT

A signal modification circuit is provided for use with multi-mode formatted data in accordance with a common mode component and a high frequency component formatted in accordance with a differential mode. The circuit includes an active module that modifies the high frequency component to generate a modified and enhanced high frequency component at an output thereof. A bypass line interconnects the inputs and outputs of the active module to bypass the active module. A low pass filter is provided along the bypass line blocking passage of the high frequency component along the bypass line.

24 Claims, 2 Drawing Sheets

MULTI-MODE SIGNAL MODIFICATION CIRCUIT WITH COMMON MODE BYPASS

BACKGROUND OF THE INVENTION

The present invention generally related to an active signal modification circuit with a common mode bypass for use with multi-mode signals conveyed within a combination signal of low frequency and high frequency components.

In the past, passive signal conditioning systems have been proposed for use with cable assemblies that convey data signals, power, speech signals and the like. Existing passive signal conditioning systems typically operate with two signal lines, along which a passive equalization circuit is provided. FIG. 1 illustrates an exemplary conventional system having a passive equalization circuit 10 connected with two input lines 12 and 14 and two output lines 16 and 18. The input lines 12 and 14 convey a differential mode signal overlapped with a common mode signal. The term "common mode" as used throughout shall refer to a signal conveyed over one or more input lines, where the signal changes level on each input line at substantially the same time and by substantially the same amount. The term "differential mode" as used throughout shall refer to signals being conveyed over a pair of lines, where the signals may change levels at different times and by different amounts. The passive equalization circuit 10 may perform equalization or filtering upon one or both of the differential and common mode signals.

However, conventional passive equalization circuits have experienced certain disadvantages. As cable assemblies increase in length, the signals conveyed by these cable assemblies become more and more attenuated. The need has arisen to add active components to the cable assembly in order to amplify, filter, modify or otherwise enhance the signals conveyed by the cable assembly. Active components that amplify or boost the signals typically amplify a difference between the input signals. Active components that operate based on a difference between the input lines also function as common mode reject filters to block passage of any signal that is common to both input lines.

Hence, cable assemblies that include active amplification components heretofore, were unable to convey both differential mode and common mode signals since the amplifiers blocked any common mode signal component provided on the input lines.

A need remains for an improved active signal modification circuit capable of transmitting both common mode and differential mode signals.

BRIEF DESCRIPTION OF THE INVENTION

An active signal modification circuit is provided that includes an input receiving a multi-mode combination signal comprising a low frequency (LF) component formatted in accordance with a first mode and a high pass (HF) component formatted in accordance with a second mode. The circuit also includes an active module joined to the inputs that modifies the high frequency component to generate a modified HF component at an output of the active module. A bypass line interconnects the inputs and the outputs to bypass the active module, while a low pass (LP) filter is provided along the bypass line to block the HF component.

Optionally, the low pass component of the multi-mode combination signal may constitute a common mode signal. As a further option, the input may comprise two input lines that convey a high frequency differential pair signal that defines the high frequency component. Optionally, the active module may include a common mode rejection circuit, such as a limiting amplifier or the like that amplifies a difference between two inputs. In an alternative embodiment, the low pass filter may comprise at least one of a transformer, an inductor and a quarter wave resonance filter, while the active module may comprise at least one of a signal integrity enhancement circuit, a retimer, a repeater and an amplifier.

DETAILED DESCRIPTION OF THE INVENTION

Figure 1:
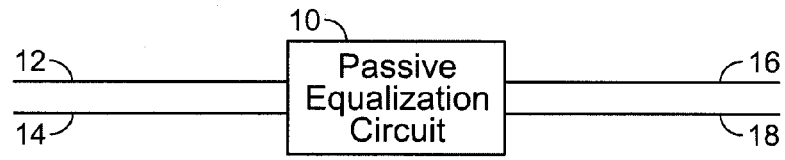
FIG. 1 illustrates a conventional passive equalization circuit that carries differential mode signals and low frequency common mode signals.
Figure 2:
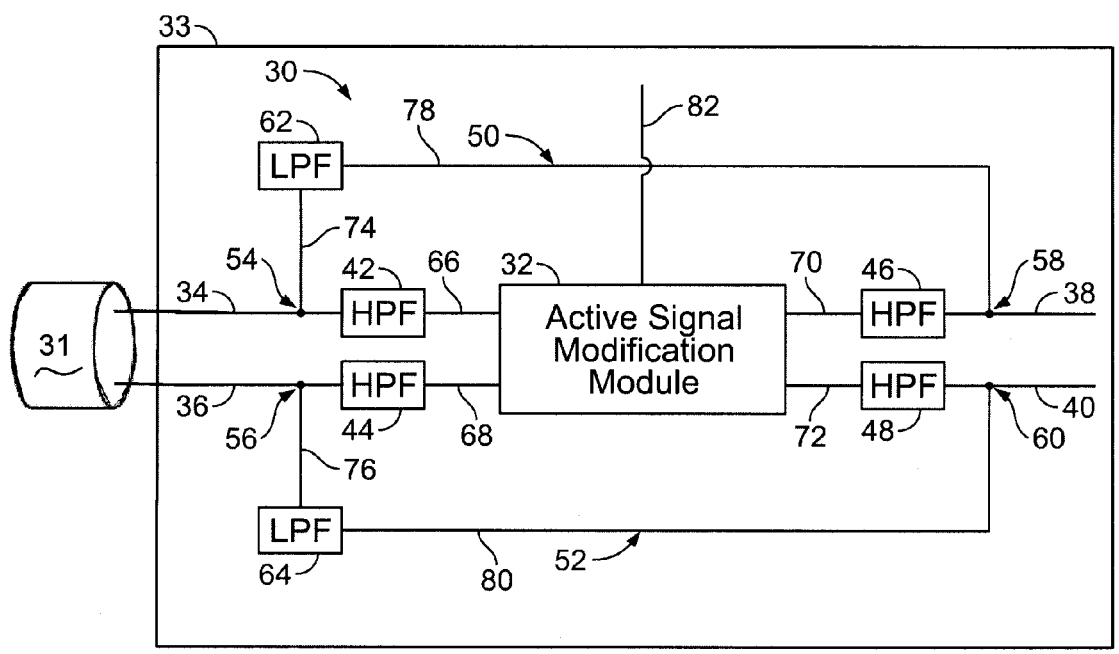
FIG. 2 illustrates a circuit diagram of an embodiment of the present invention.

FIG. 2 illustrates an active bypass circuit 30 formed in accordance with an embodiment of the invention and may be used in a variety of applications. By way of example only, the active bypass circuit 30 may be joined to a transmission line or cable assembly 31 that is utilized to convey one or more of data signals, voice signals, power signals and the like. The cable assembly 31 may have any of several lengths, such as 10 meters, 25 meters, 50 meters and the like. As the length of the cable assembly 31 varies, the active bypass circuit 30 is adjusted accordingly to account for and correct changes in the electrical characteristics of the signals conveyed to and from the active bypass circuit 30. Examples of such electrical characteristics may include jitter, skew, attenuation, cross-talk and the like.

The active bypass circuit 30 includes an active signal modification module 32 that is joined with input lines 34 and 36 and with output lines 38 and 40. The active bypass circuit 30 may be implemented on a circuit board 33 with input lines 34 and 36 on the circuit board 33. Alternatively, the input and output lines 34, 36, 38 and 40 may be discrete insulated wires, wires/traces of a flex circuit, wires/strands in a cable and the like. High pass filters 42 and 44 are provided along corresponding input lines 34 and 36, respectively. High pass filters 46 and 48 are provided along corresponding output lines 38 and 40, respectively. Bypass lines 50 and 52 are joined at nodes 54 and 56 with the input lines 34 and 36, respectively. The bypass lines 50 and 52 interconnect the input lines 34 and 36 and output lines 38 and 40, respectively. The nodes 54 and 56 are located upstream (relative to the signal propogation path) of the high pass filters 42 and 44. The bypass lines 50 and 52 bypass the high pass filters 42, 44, 46 and 48 and the active signal modification module 32 to rejoin with the output lines 38 and 40 at nodes 58 and 60, respectively. The active signal modification module 32 receives power from an external source along power line 82. In FIG. 2, each of high pass filters 42, 44, 46 and 48 are connected in series with the active signal modification module 32. Low pass filters 62 and 64 are provided along the bypass lines 50 and 52, respectively. The low pass filter 62 is joined in parallel with the high pass filters 42 and 46 and the active signal modification module 32, while the low pass filter 64 is joined in parallel with the high pass filters 44 and 48 and the active signal modification module 32.

The input lines 34 and 36 may receive a variety of multi-mode combination signals that may include one or more of data, voice, power signals and the like. The term "mulitmode", as used throughout, shall mean that corresponding overlapping signals are formatted in accordance with different transmission modes, such as common mode and differential mode. The combination signals include a low frequency component carrying a signal formatted in accordance with a first mode and a high frequency component carrying a signal formatted in accordance with a different second mode. The high pass filters 42 and 44 pass the high frequency components of the combination signal and block the low frequency components of the combination signal. The low pass filters 62 and 64 pass the low frequency components conveyed over input lines 34 and 36, respectively, and block the high frequency components of the combination signal. Hence, line segments 66 and 68 convey only the high frequency components that are output from the high pass filters 42 and 44, respectively, to the active signal modification module 32.

The active signal modification module 32 performs various operations upon the incoming high frequency components of the combination signals, such as amplification, equalization, and the like. The active signal modification module 32 may perform other signal integrity or enhancement operations, as well as filtering. By way of example only, the active signal modification module 32 may constitute an amplifier, a retimer, a repeater, a filter and the like. Once the high frequency components at line segments 66 and 68 are processed by the active signal modification module 32, modified high frequency components are output upon line segments 70 and 72. The modified high frequency components are passed through high pass filters 46 and 48 and conveyed onto the output lines 38 and 40. The high pass filters 46 and 48 isolate the active signal modification module 32 from any low frequency components that may be introduced onto output lines 38 and 40 from the bypass lines 50 and 52 or some other source downstream.

Returning to the input side, the combination signals are conveyed along line segments 74 and 76 to the low pass filters 62 and 64, respectively, which block the high frequency components therefrom and only pass the low frequency components. The low frequency components are passed onto line segments 78 and 80 which are then merged back at nodes 58 and 60, respectively, with the modified high frequency components generated from the active signal modification module 32. In the foregoing manner, the bypass lines 50 and 52 interconnect the input and output lines 34, 36, 38 and 40 to bypass the active signal modification module 32.

By way of example only, the combination signal introduced at input lines 34 and 36 may include a differential mode signal conveyed at a high frequency, thereby constituting the high frequency component passed by high pass filters 42 and 44. In addition, the combination signal at lines 34 and 36 may include a common mode signal overlaid with the high frequency differential mode signal. The common mode signal changes levels at a significantly lower rate than in the differential mode signal, and thus the common mode signal defines and constitutes the low frequency component. The low pass filters 62 and 64 pass the common mode signal onto line segments 78 and 80 and block the differential mode signal. The active signal modification module 32 modifies the differential signal introduced at line segments 66 and 68 to output a modified differential signal at line segments 70 and 72. The modified differential signal is passed through high pass filters 46 and 48 and rejoined at nodes 58 and 60 with the common mode signal conveyed over line segments 78 and 80, respectively.

Figure 3:
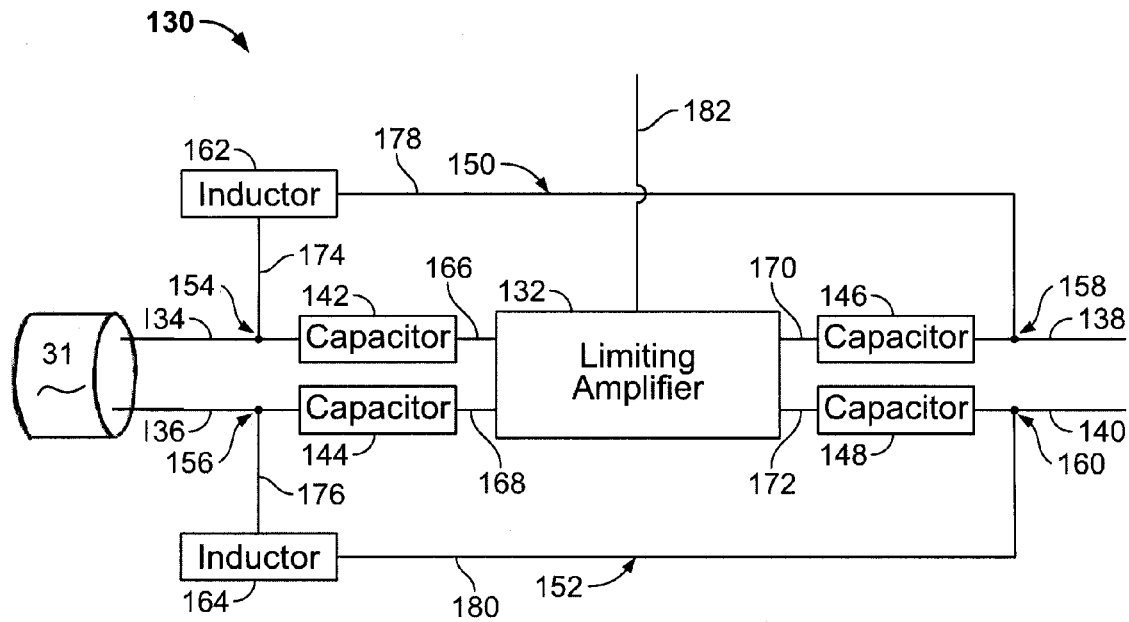
FIG. 3 illustrates a circuit diagram of an alternative embodiment of the present invention.

FIG. 3 illustrates an alternative embodiment for an active bypass circuit 130 that includes a limiting amplifier 132 joined with input lines 134 and 136. The active bypass circuit 130 provides an output onto output lines 138 and 140. Capacitors 142 and 144 are provided along the input lines 134 and 136, respectively, and capacitors 146 and 148 are provided along output lines 138 and 140, respectively. Bypass lines 150 and 152 interconnect the input lines 134 and 136 and output lines 138 and 140, respectively, at nodes 154, 156, 158 and 160. Inductors 162 and 164 are provided along the bypass lines 178 and 180, respectively. The input lines 134 and 136 carry combination signals comprised of high frequency and low frequency components of different modes. The inductors 162 and 164 block the high frequency components received at segments 174 and 176 and pass the low frequency components of the combination signals. The capacitors 142 and 144 block the low frequency components, while passing the high frequency components onto line segments 166 and 168.

The limiting amplifier 132 boosts or amplifies the differential signal provided on line segments 166 and 168 and clips the output signal to provide a balanced differential output signal on line segments 170 and 172. When a balanced limiting amplifier 130 is used, the active bypass circuit 130 enables the combination signal provided at input lines 134 and 136 to be balanced or unbalanced, while still providing a balanced differential output signal onto output lines 138 and 140.

Figure 4:
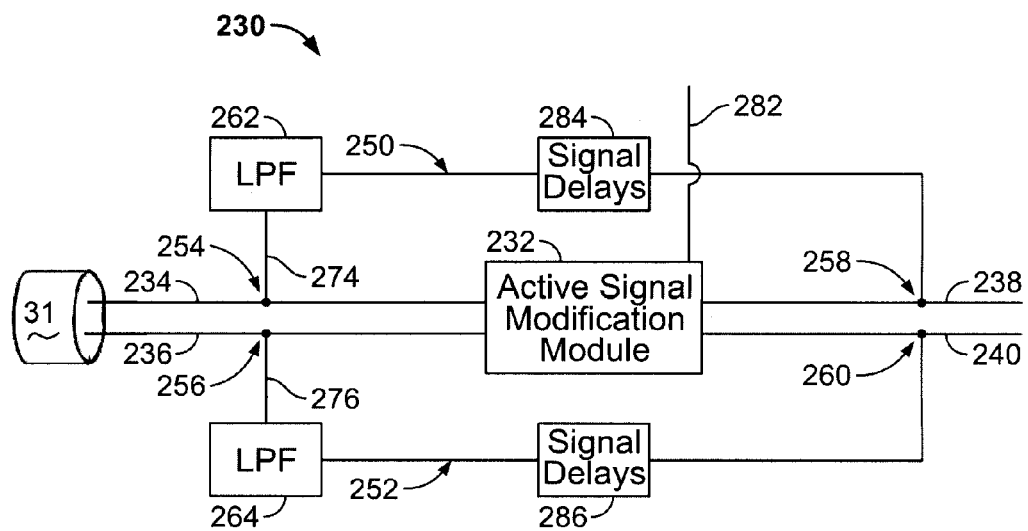
FIG. 4 illustrates a circuit diagram of an alternative embodiment of the present invention.

FIG. 4 illustrates an alternative embodiment for an active bypass circuit 230 that includes input lines 234 and 236 and output lines 238 and 240. An active signal modification module 232 operates upon combination signals received at input lines 234 and 236 to generate modified combination signals output onto output lines 238 and 240. Bypass lines 250 and 252 interconnect the input lines 234 and 236 with the output lines 238 and 240, respectively. The bypass lines 250 and 252 include low pass filters 262 and 264 and signal delays 284 and 286. The low pass filters 262 and 264 block any high frequency components within the combination signals at lines 234 and 236 and pass only low frequency components therein. The combination signals are entirely passed to the active signal modification module 232.

The active signal modification module 232 may include a series of components that introduce a delay into the combination signal, such that the output of the active signal modification module 232 has been time shifted with respect to the low frequency components passed over the bypass lines 250 and 252 before being rejoined at nodes 258 and 260. The active signal modification module 232 receives power along power line 282.

The active bypass circuits discussed above support a variety of applications, including among others, side band signaling that is propagated with high pass signals. A variety of bit rates are supported by the combination signal, including among others, a 2.125 gigabit rate, a 5 gigabit rate, and a 10 gigabit rate. Optionally, the inductors 162 and 164 may have inductance values of greater than 50 nanoHenries (nH), and preferably an inductance value of between 1000 and 5000 nanoHenries. The values for the inductors 162 and 164 may be varied depending upon the cutoff frequency for the low pass frequency band. By way of example, all frequencies below 50 kilohertz may be passed and everything there above rejected. A cutoff frequency of approximately 50 kilohertz supports a data rate of 8.7 kilohertz when it is desirable to pass up to the third harmonic of the fundamental frequency. Optionally, other circuit components may be used in lieu of, or in addition to, inductors 162 and 164 to make any type of filter (e.g., band pass and band reject filters) desired depending on the frequency relationship between the signals to bypass and the signals that should not bypass.

The component values for the elements of the filters and the type of filters may also be varied depending upon the application, data rates, cutoff frequencies and the like. In the filter used in the example of FIG. 3, it may be desirable to pass signal components having a fundamental frequency of 10 megahertz, 100 megahertz or the like. As an example, in order to pass a 10 megahertz signal, a 0.1 microfarad (uf) capacitor may be used. To pass a high frequency component having a 100 megahertz fundamental frequency, a 0.01 microfarad capacitor may be used. A 100 megahertz fundamental frequency supports a 1.25 gigahertz bit rate.

As an example only, the active signal modification module may constitute a limiting amplifier cut such as offered by Maxum Corporation (MAX-811SEUS-T) or by Mircrell (SY88927VKC-TR) the high pass filters illustrated in FIG. 2 may be removed in an alternative embodiment, optionally, the low pass filters 62 and 64 may be formed from inductors, transformers, quarter wave resonance filters, Chebychev or Butterworth filters or the like. In accordance with the foregoing, a low frequency bypass circuit is provided that yields a DC connection interconnected in parallel with a series circuit comprising DC blocking capacitors and active circuitry. The DC bypass circuitry includes low pass filters to provide high frequency signals following an alternative DC path and being inadvertently rejoined with the outputs of the active circuitry out of phase.

It is understood that the active bypass circuitry may be implemented with discrete circuits or integrated circuits and may be provided on a circuit board, where the input and output lines constitute traces on the circuit board. Optionally, embedded circuit components may be built into the printed circuit board geometry (for example, inductors may be made with small long length traces built into the printed circuit board, while capacitors may be achieved by making traces very close but not touching on the circuit board). In accordance with the foregoing, a common mode signal, such as a signal in the kilobaud frequency range may be provided on both input lines overlapped with a high speed differential signal which may be transmitted at 2 gigabits per second and higher.

The terms device, module and circuit, as used throughout, are intended to have their broadest meaning and include, among other things, integrated circuitry and discrete components as well as processors and microprocessors driven by firmware or software to perform the above described operations. Optinally, the signal modification circuitry may be passive. Optionally, the signal modification circuitry may be passive.

While the invention has been described in terms of various specific embodiments, those skilled in the art will recognize that the invention can be practiced with modification within the spirit and scope of the claims.

What is claimed is:

1. An active signal modification circuit, comprising:
   an input comprising two input lines configured to receive a differential pair signal having a low frequency (LF) component formatted in accordance with a first mode and a HF component formatted in accordance with a second mode;
   a signal modification module, joined to said input, modifying said HF component of said differential pair signal and generating a modified HF component at an output of said signal modification module;
   a bypass line interconnecting said input and said output to bypass said signal modification module; and
   a low pass (LP) filter provided along said bypass line blocking said HF component of said differential pair signals.

2. The circuit of claim 1, wherein said LF component constitutes a common mode signal.

3. The circuit of claim 1, wherein said input comprises two input lines configured to receive balanced differential signals of equal and opposite polarity constituting said HF component.

4. The circuit of claim 1, wherein said signal modification module includes an active device that rejects signals formatted in accordance with a common mode.

5. The circuit of claim 1, wherein said signal modification mode includes a limiting amplifier that amplifies a difference between two said inputs.

6. The circuit of claim 1, wherein said signal modification mode includes a limiting amplifier that outputs a balanced differential signal as said modified HF component.

7. The circuit of claim 1, further comprising a high pass (HP) filter provided at said input between said signal modification module and a node connecting said input and said bypass line.

8. The circuit of claim 1, further comprising a HP filter provided at said input, said HP filter blocking passage to said signal modification module of said LF component.

9. The circuit of claim 1, wherein said LP filter includes at least one of a transformer, an inductor and a quarter wave resonance filter.

10. The circuit of claim 1, wherein said signal modification module comprises at least one of a signal modification circuit, a retimer, a repeater and an amplifier.

11. The circuit of claim 1, wherein, said input and said output constitute traces on one of a flex circuit and a circuit board.

12. The circuit of claim 1, wherein said inputs are configured to convey said HF differential pair signal at a data rate of at least 2 gigabits per second.

13. The circuit of claim 1, wherein said LP filter passes frequency components of up to 10 megahertz and rejects frequency components greater than 10 megahertz.

14. The circuit of claim 1, further comprising a first high pass (HP) filter provided between a first node and said signal modification module and a second HP filter provided between a second node and said signal modification module, said first node connecting said input and said bypass line, said second node connecting said bypass line and said output.

15. The circuit of claim 1, further comprising a signal delay provided along said bypass line.

16. A signal modification cable assembly, comprising:
    a cable comprising two input lines configured to convey a pair signal having a low frequency (LF) component formatted in accordance with a first mode and a HF component formatted in accordance with a second mode;
    a signal modification module, joined to said cable, modifying said HF component and generating a modified HF component at an output of said signal modification module;
    a bypass line interconnecting said cable and said output to bypass said signal modification module; and
    a low pass (LP) filter provided along said bypass line blocking said HF component.

17. The cable assembly of claim 16, wherein said LF component constitutes a common mode signal.

18. The cable assembly of claim 16, wherein said signal modification module includes an active device that rejects signals formatted in accordance with a common mode.

19. The cable assembly of claim 16, further comprising a high pass (HP) filter provided between said signal modification module and a node between said cable and said bypass line.

20. The cable assembly of claim 16, further comprising a HP filter provided at said cable, said HP filter blocking passage to said signal modification module of said LF component.

21. The cable assembly of claim 16, wherein said LP filter includes at least one of a transformer, an inductor and a quarter wave resonance filter.

22. The cable assembly of claim 16, wherein said signal modification module comprises at least one of a signal modification circuit, a retimer, a repeater and an amplifier.

23. The cable assembly of claim 16, further comprising a first high pass (HP) filter provided between a first node and said signal modification module and a second HP filter provided between a second node and said signal modification module, said first node connecting said cable and said bypass line, said second node connecting said bypass line and said output.

24. The cable assembly of claim 16, further comprising a signal delay provided along said bypass line.

* * * * *